Patented Nov. 5, 1940

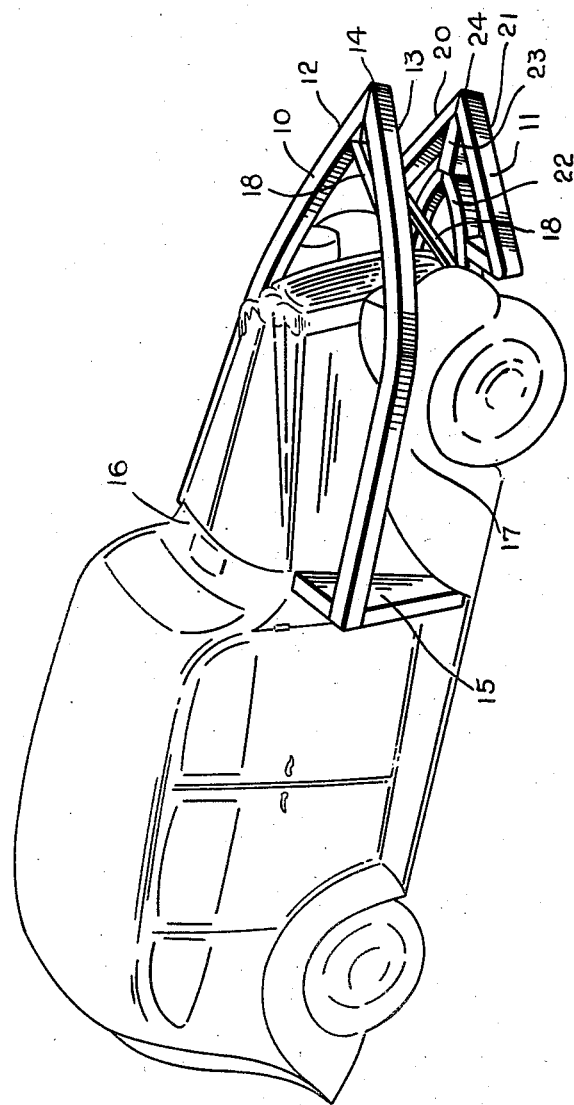

2,220,272

UNITED STATES PATENT OFFICE 2,220,272

AUTOMOBILE GUARD

Mike Pitura and Karl Zyma, Creighton Mine, Ontario, Canada

Application February 7, 1939, Serial No. 255,138
In Canada December 20, 1938

1 Claim. (Cl. 293—55)

This invention relates to improvements in an automobile guard. Its primary object being to provide means to protect the fenders, radiator grilles, headlights, etc., of an automobile from damage.

A further object of the invention is to provide an automobile guard for the purpose set forth which may be readily detached when not required.

With these and other objects in view that may appear while the description proceeds the invention consists in the novel construction and arrangement of parts as hereinafter more specifically set forth, claimed, and shown in the accompanying drawing forming part of this application and in which the single figure is a perspective view of an automobile having my improved guard attached in position thereon.

Referring more in detail to the drawing in which similar reference characters designate corresponding parts throughout the several views it will be seen the invention consists of an upper frame 10 and a lower frame 11.

The upper frame 10 is constructed with two longitudinal members 12 and 13 which are joined together at the front point 14. The rear ends are supported by support member 15 which rest against the cowl 16 of the automobile body. The said members 12 and 13 are arranged to extend to the width of the fenders 17 to provide protection for the same. Angle supports 18 are provided to support the front end. These are attached to the lower frame 11 for support and are removable with the same.

The lower frame 11 consists of two members 20 and 21 secured together in a V construction. A supporting structure 22 for the lower frame is secured to the front of the automobile frame and the members 20 and 21 are secured thereto by a central member 23 which supports the front end 24.

The structure thus formed is detachably secured to the chassis of the automobile in a convenient manner suitably for easy attachment or detachment therefrom. It will be seen the device is arranged to surround the front of the automobile for protection purposes and that it is so constructed as not to cause any obstruction to the headlights.

It is believed that the construction and advantages of the structure shown may be apparent from the foregoing paragraphs taken in conjunction with the accompanying drawing without further detailed description.

While the preferred embodiment of the invention has been disclosed it is understood that minor changes in the details of construction, combination and arrangement of co-operating parts may be resorted to within the scope of what is claimed without departing from the spirit of the invention.

It is claimed:

An automobile guard comprising an upper frame composed of longitudinal bars extending along opposite sides of the automobile hood for the full length thereof in a horizontal plane above the front fenders and in a vertical plane to the outer edges thereof, the forward ends of said bars extending beyond the front of the automobile and converging together, vertical support members extending upwardly from the running board for the inner ends of said bars, a lower frame consisting of a V-shaped structure adapted to be attached to the chassis of the automobile and project forwardly therefrom, said lower frame being disposed on a lower plane in parallel relation to said upper frame, and brace bars extending between said upper and lower frames.

MIKE PITURA.
KARL ZYMA.